Oct. 1, 1968   D. A. JERKO   3,404,277
CONSTANT VELOCITY DRIVE FOR MOSSBAUER EFFECT ANALYZER
Filed Sept. 4, 1964   2 Sheets-Sheet 1

INVENTOR
David A. Jerko

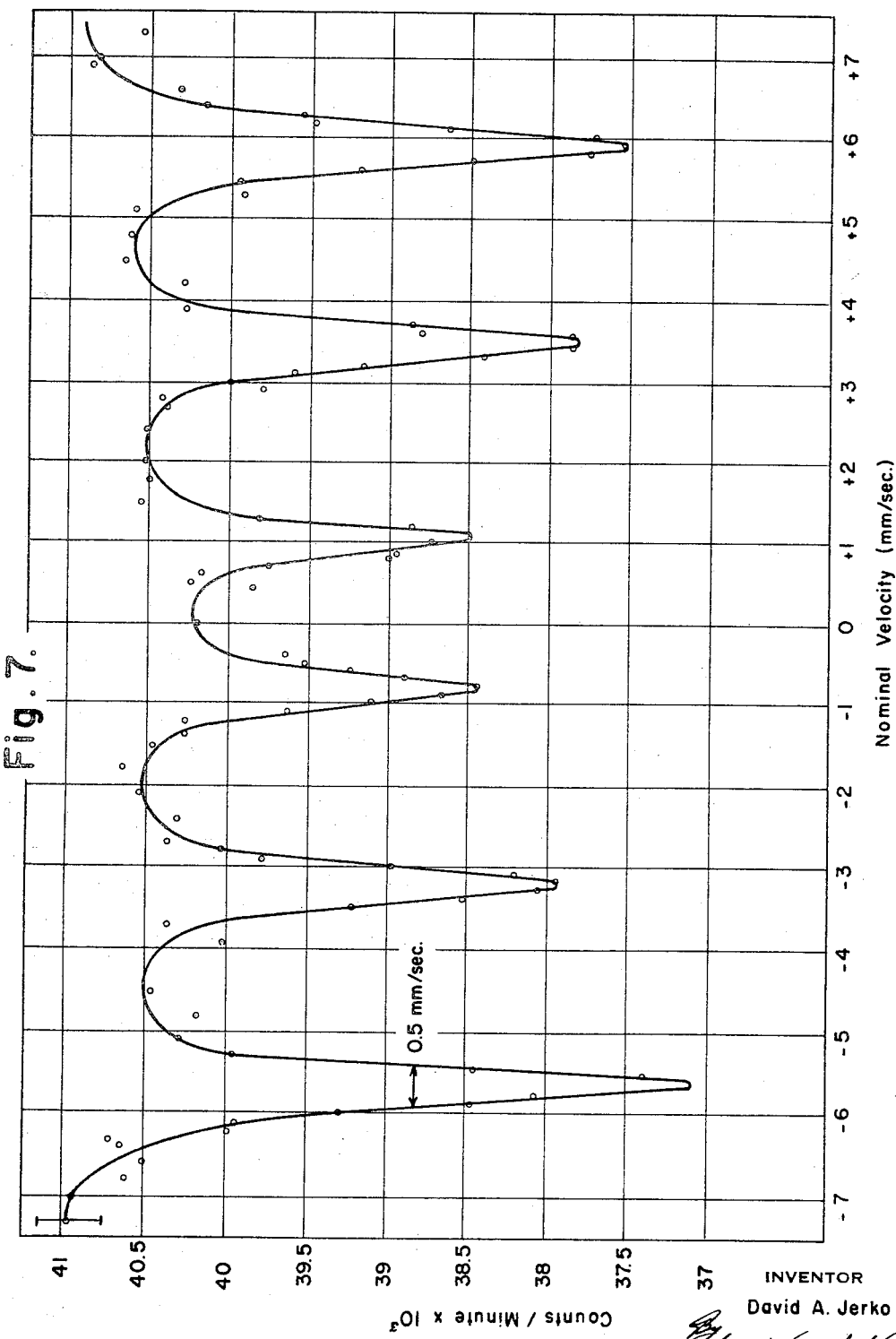

ent Office 3,404,277
Patented Oct. 1, 1968

3,404,277
CONSTANT VELOCITY DRIVE FOR MOSSBAUER EFFECT ANALYZER
David A. Jerko, Pittsburgh, Pa., assignor, by mesne assignments, to International Chemical & Nuclear Corporation, Burbank, Calif., a corporation of California
Filed Sept. 4, 1964, Ser. No. 394,541
1 Claim. (Cl. 250—106)

ABSTRACT OF THE DISCLOSURE

A Doppler effect analyzer and particularly a mechanical Mossbauer analyzer providing a constant velociy of source relative to absorber. A plurality of spaced parallel rods carry a source of gamma radiation, a gamma radiation detector adjacent the other end and resonant absorber for said gamma radiation between said source and said detector, one of the source and absorber being slidably mounted on the rods for movement thereof, a lead screw means parallel to the rods and threadingly engaging a moving nut, a nut engaging means on one of said movable source and absorber, drive means from the lead screw and a resilient shock absorbing connection between the drive means and the lead screw which are isolated from one another by motion absorbing means.

---

Figure 1:
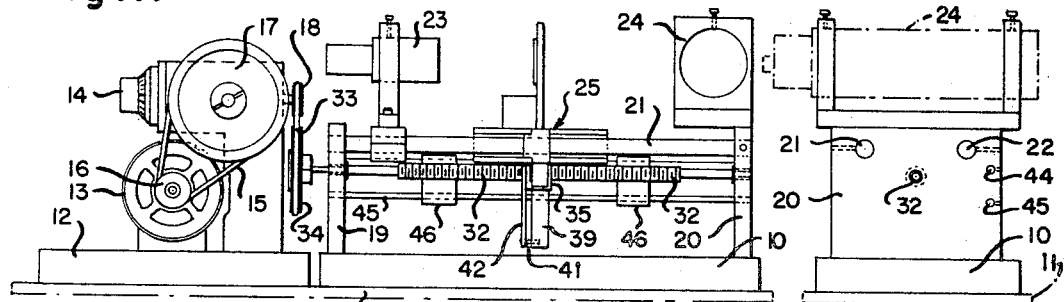

This invention relates to Doppler effect analyzers and particularly to a mechanical Mossbauer effect analyzer which provides a constant velocity of source relative to absorber.

The Mossbauer effect analyzer has been known as a technical tool for some years. Basically it consists of a holder for a source of gamma rays, a holder for a resonant absorber material in the ground state which will absorb and re-emit like gamma rays and a means for moving the source holder and absorber holder relatively to one another. Two basically different methods have been used in the past to analyze the Mossbauer effect. In one method the source or absorber is moved with a selected constant velocity for a known time and counts made during this time are recorded. In the other method the source sweeps periodically through a range of velocities and the counts in predetermined ranges of velocity are stored in different channels of a multichannel analyzer until a complete study is assembled. Both methods are faced with a common problem, that of controlling vibration while maintaining the desired constancy or variability of velocity. These different methods are represented by the inclined plane apparatus described by Hans Frauenfelder; the toy train apparatus described by Richard Haskins in a Gettysburg College thesis of Nov. 30, 1962; the rotating tilted disc apparatus described by Bearden, Mattern and Nobel in a Cornell University thesis and by the three step cam apparatus described by Margulies in a University of Illinois thesis.

The present invention is directed to a constant velocity type Mossbauer effect analyzer in which the problems of vibration and constancy of velocity at each setting between the source and absorber have been solved.

In the present invention, there is provided a pair of spaced parallel cylindrical rods, a source of gamma radiation adjacent one end of said rods, a gamma radiation detector at the opposite end of said rods, an absorber for gamma radiation slidably mounted on said rods for movement lengthwise thereof, lead screw means parallel to said rods and threadingly engaging said absorber, reversible drive means for said lead screw, a resilient shock absorbing connection between said drive means and said lead screw and shock absorbing means isolating said drive means from the cylindrical rods. Preferably the cylindrical rods, lead screw and absorber from a lathe-type device with high precision machining throughout. The drive means is preferably a well known Librascope Ball-Disc Integrator with motor which permits precise velocity selection in the range up to about 15 millimeters per second. The resilient shock absorbing connection between the drive and lead screw is preferably a rubber O-ring.

Figures 2, 3:
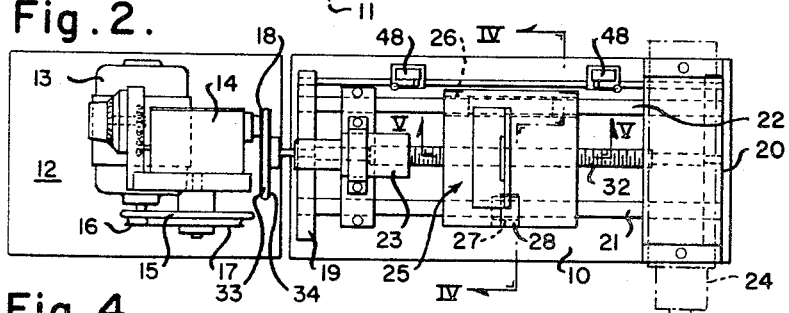
Figures 4, 5:
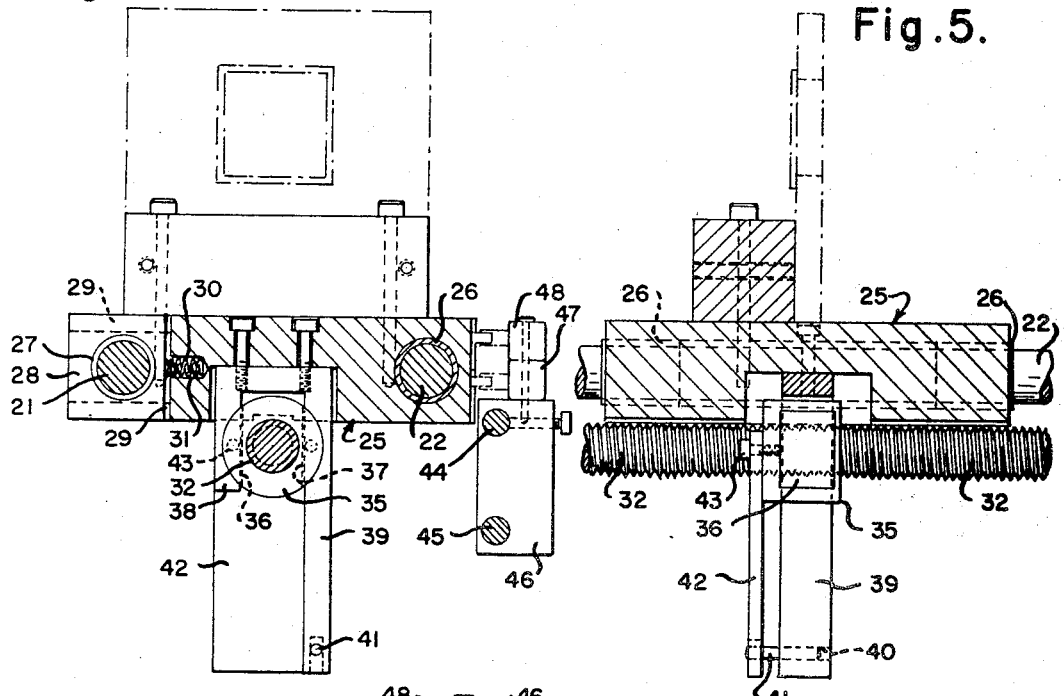
Figure 6:
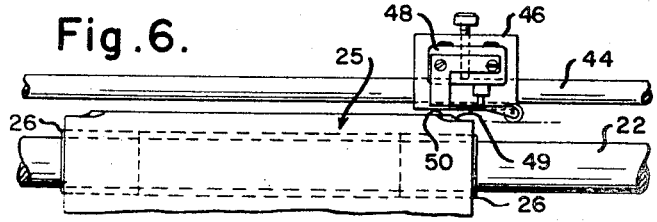

In the foregoing general description certain objects, advantages and purposes of this invention have been set out. Other objects, advantages and purposes will be apparent from a consideration of the following description and the accompanying drawings in which:

FIGURE 1 is a side elevation of a Mossbauer effect analyzer according to this invention;
FIGURE 2 is a top plan view of the analyzer of FIGURE 1;
FIGURE 3 is an end elevation of the apparatus of FIGURE 1;
FIGURE 4 is an enlarged section on the line IV—IV of FIGURE 2;
FIGURE 5 is an enlarged fragmentary section of the absorber taken on the line V—V of FIGURE 2;
FIGURE 6 is an enlarged fragmentary view of the reversing switch arrangement; and
FIGURE 7 is a typical analyzer curve of the machine of FIGURES 1 and 2.

Referring to the drawings, there is illustrated a base 10 preferably having a vibration absorbing cushion 11. A drive base 12 is mounted on cushion 11. The drive base 12 carries a drive motor 18 and a Librascope Ball-Disc Integrator drive 14 each independently mounted on the base. The drive motor 13 drives the Librascope drive 14 by means of a rubber O-ring 15 over pulleys 16 and 17 on the motor and drive respectively. An analyzer base 10 is fixed to cushion 11 and spaced from motor base 12 to prevent passage of vibration. Vertical end members 19 and 20 carry the ends of cylindrical rods 21 and 22 which are parallel to base 10 and to each other. A gamma ray source holder 23 is fixed to said rods 21 and 22 at a preselected position adjacent one end. A gamma ray detector 24 is fixed to an end plate at the opposite end of the rods. It could, however, be fixed to the rods 21 and 22 and be selectively movable thereon. The detector used in the illustrated embodiment is a proportional counter tube, however, a scintillation crystal or other detector of gamma rays could be used. An absorber carriage and holder 25 is journaled for sliding movement on said rods by heavy duty sleeve bearings 26 and 27. Bearing 27 is carried in a spring loaded block 28 held in holder carriage 25 by tongue and groove guides 29 on each side of block 28. Spring 30 in recess 31 in carriage 25 urges the block outwardly. A lead screw 32 is journaled through the vertical end member 19 adjacent the drive base, threaded through drive nut 35 in the absorber carriage and into the vertical end member 20 remote from the drive and is driven for rotation by a rubber O-ring 33 acting on its pulley 34 from a pulley 18 on the Librascope drive. It is essential that this lead screw be precision ground to close tolerance to provide uniform motion of the carriage. The drive nut 35 is cylindrical in form and is provided with two flats 36 and 37 on opposite sides which are engaged by depending arms 38 and 39 fixed to the bottom of absorber carriage 25. One of the arms 39 is longer than the other and is provided with an opening 40 receiving a pin 41 on a locking plate 42 which is fastened to nut 35 by screws 43. This arrangement of lock nut suspension is designed to reduce the torque passed to the moving carriage as well as the transmission of vibration from the screw 32 to carriage 25.

A pair of carrier rods 44 and 45 extend parallel to one another and to the rods 21 and 22 between the vertical end members 19 and 20. These rods 44 and 45 carry a switch holder 46 which in turn carries superposed micro switches 47 and 48. The switches 47 and 48 are adapted to be engaged by ramps 49 and 50. Ramp 49 engages switch 47 as the carriage moves in one direction or the other to shut off the counter after which ramp 50 engages switch 48 to reverse the motor 13 and return the carriage toward the opposite end of the guide rods 21 and 22.

The operation of the analyzer of this invention is as follows: A desired source such as Co$^{57}$ in stainless steel is mounted in the source holder 23. An absorber material such as Fe$^{57}$ (ground state) in iron is mounted in the absorber holder 25 and the drive motor 13 is started. The motor drives the Librascope drive 14 by means of O-ring 15 and the Librascope drive in turn drives lead screw 32 through O-ring 33. This causes the absorber carriage 25 to move relatively to the source 23 and detector 24. The detector counts unabsorbed gamma rays and the result for the particular velocity is charted as on FIGURE 7.

The relative velocity of the absorber with respect to the source and detector is varied by varying the position of the drive ball and disc in the Librascope drive in usual manner to provide different constant velocities whose detector count pattern is charted as shown on FIGURE 3.

The device of this invention may also be operated by mounting the source on a movable carriage and mounting the absorber in a fixed holder between the moving source and detector.

The device of this invention could be used to develop a sweep type of analysis by using a variable pitch screw for screw 32 or a variable speed drive and counting the gamma rays obtained at different velocities through a multichannel analyzer.

In the foregoing specification, certain preferred embodiments and practices of this invention have been illustrated and described. It will be understood, however, that this invention may be otherwise embodied within the scope of the following claim.

I claim:
1. A Doppler effect analyzer comprising a pair of spaced parallel guide members, a source of gamma radiation adjacent one end of said guide members, a gamma radiation detector at the opposite end of said guide members, a resonant absorber for said gamma radiation between said source and said detector, one of said source and said absorber slidably mounted on said guide members for movement lengthwise thereof, screw means parallel to said guide members and threadingly engaging a moving nut, said nut being cylindrical in external periphery and having a pair of opposed flat areas on opposite sides thereof, means on one of said source and said absorber, said means engaging the flats on said nut and having an elongated arm engaging an arm affixed to the nut remote from the axis of the nut reversible drive means for said screw, a resilient shock absorbing connection between said drive means and said screw and motion absorbing means isolating said drive means from the guide members.

References Cited

UNITED STATES PATENTS

| | | | |
|---|---|---|---|
| 2,756,606 | 7/1956 | Staples | 82—23 X |
| 2,858,450 | 10/1958 | Holden | 250—83.3 X |
| 2,889,463 | 6/1959 | Linsert et al. | |
| 2,951,161 | 8/1960 | Foster et al. | |
| 2,965,758 | 12/1960 | Malick. | |
| 3,179,800 | 4/1965 | McNamara. | |
| 3,193,683 | 7/1965 | Reiffel. | |

OTHER REFERENCES

Wertheim, G. K.: Mossbauer Effect, American Journal of Physics, vol. 31, No. 1, January 1963, pp. 1–6 relied on RALPH G. NILSON, *Primary Examiner.*

S. ELBAUM, *Assistant Examiner.*

UNITED STATES PATENT OFFICE
CERTIFICATE OF CORRECTION

Patent No. 3,404,277                     October 1, 1968

David A. Jerko

It is certified that error appears in the above identified patent and that said Letters Patent are hereby corrected as shown below:

Column 1, line 13, "velociy" should read -- velocity --.
Column 2, line 7, after "drive" insert -- means --.

Signed and sealed this 24th day of February 1970.

(SEAL)
Attest:

Edward M. Fletcher, Jr.
Attesting Officer

WILLIAM E. SCHUYLER, JR
Commissioner of Patents